UNITED STATES PATENT OFFICE.

JAMES H. STEBBINS, JR., OF NEW YORK, N. Y.

DYESTUFFS.

1,235,253.        Specification of Letters Patent.      Patented July 31, 1917.

No Drawing.     Application filed January 9, 1917. Serial No. 141,361.

*To all whom it may concern:*

Be it known that I, JAMES H. STEBBINS, Jr., a citizen of the United States, residing at No. 80 Madison avenue, in the city, county, and State of New York, have invented certain new and useful Improvements in Dyestuffs; and I do hereby declare the following to be a full, clear, and exact description of the invention, such as will enable others skilled in the art to which it appertains to make and use the same.

This invention relates to new azo dyestuffs and methods of producing the same; and more particularly to azo dyestuffs soluble in water and capable of dyeing both wool and cotton without the use of mordants.

The new dyestuffs of the present invention are derived from 1.8-dioxynaphthalene-3.6-disulfonic acid, otherwise known as chromotropic acid, by combining this acid with diazotized benzidin, or its equivalent, and with another diazotized aromatic amin, such as diazotized para-nitranilin or diazotized para-amido-phenylglycin or diazo picramic acid; and by further combining with the diazotized benzidin an end component such as 1.5-naphtholsulfonic acid or the 1.4-naphtholsulfonic acid; all as more fully hereinafter set forth and as claimed.

The new dyestuffs of the present invention are characterized by the following graphically represented constitution:

$$R-N:N-R_1-N:N-R_2-N:N-R_3$$

where $R_1$ is the neculus of the chromotropic acid, $R_2$ the diaryl nucleus of benzidin or its equivalent, $R_3$ an aromatic nucleus of an end component such as a naphtholsulfonic acid, and R an aromatic nucleus derived from a diazotized aromatic amin such as those referred to above. These dyestuffs are blue to black to brown products soluble in water and capable of dyeing cotton in sodium sulfate baths bluish or purplish shades, and also capable of dyeing wool in acid sodium sulfate baths blue to black to brown shades.

In the production of the new dyestuffs the chromotropic acid is combined with tetrazotized benzidin or its equivalent and also with a diazotized aromatic amin such as those referred to above; and the tetrazotized benzidin is also combined with an end component such as 1.5-naphtholsulfonic acid or 1.4-naphtholsulfonic acid.

The invention will be further illustrated by the following specific examples. In these examples, and in the accompanying claims, I will refer to the 1.8-dioxynaphthalene-3.6-disulfonic acid by its simpler name chromotropic acid. This chromotropic acid has the following graphically represented constitution, as is indicated by the name 1.8-dioxynaphthalene-3.6-disulfonic acid.

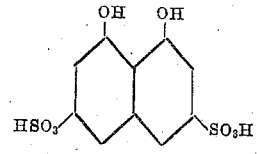

Example 1: 13.8 kgs. of para-nitranilin are diazotized in the usual way by treatment with 60 liters of hydrochloric acid of 1.2 specific gravity diluted with 200 liters of water and 6.9 kgs. sodium nitrite dissolved in 200 liters of water. The diazo-para-nitranilin chlorid solution thus obtained is then gradually stirred into a solution of 40.4 kgs. of the sodium salt of chromotropic acid in 100 liters of water. At the end of the operation, it will be found that the solution has a strong acid reaction. A strong scarlet dyestuff is thus obtained. The dye solution is allowed to stand over night. It is then made alkaline by the addition of 140.0 kgs. anhydrous sodium carbonate which is sufficient to neutralize the 60 liters of hydrochloric acid previously used and 37.5 liters of hydrochloric acid to be used in the next operation. A dark blue precipitate with a purplish solution is formed. On heating to boiling the precipitate is dissolved yielding an intensely purple solution. On cooling the dyestuff separates in the form of its sodium salt, as a semi-solid mass of crystals. The crystalline mass is then broken up by stirring and treated under constant stirring with one molecular proportion of tetrazo-diphenyl chlorid. The solution immediately turns black with the formation of a black precipitate of the new intermediate product. The mixture is allowed to stand in the cold for about 6 hours and there is then stirred into the same a solution of 22.4 kgs. of 1.5-naphtholsulfonic acid dissolved in 300 liters of water and the whole is made alkaline with 16 kgs. of caustic soda. The black precipitate of the intermediate begins to dissolve immediately, yielding a violet-colored solution but on standing, it is ultimately transformed into a violet-black precipitate with only a small amount of coloring matter in solution. The precipitate is filtered off and dried.

The new azo dyestuff thus produced dissolves in hot water with a bluish Bordeaux color. On cooling it partly separates out again. It dyes unmordanted cotton in a neutral sodium sulfate bath a bluish shade; while silk and wool are dyed in an acid bath of sodium sulfate various shades of brown to black, depending upon the quantity of dye used.

The tetrazo-diphenyl chlorid referred to in the above example may be prepared from benzidin as follows:

18.4 kgs. benzidin are dissolved in 37.3 liters of hydrochloric acid of 1.2 specific gravity and 300 liters of water. The solution is cooled with ice and diazotized by treatment with 13.8 kgs. sodium nitrite dissolved in 300 liters of water.

Example 2: 10 kgs. of para-amido-phenylglycin (obtained by the action of monochloracetic acid upon paraphenylenediamin) are dissolved in 20 liters of hydrochloric acid of 1.2 specific gravity diluted with 1000 liters of water. The solution is now cooled with ice and diazotized by treatment with 4 kgs. sodium nitrite dissolved in 100 liters of water. The diazophenylglycin chlorid solution is then stirred into a solution of 24 kgs. of the sodium salt of chromotropic acid, 30 kgs. sodium carbonate and 500 liters of water. In this case, it was found more advantageous to operate in an alkaline solution. An intense very soluble crimson dye is thus formed. The crimson dye solution is then treated with 30 kgs. more of sodium carbonate and then with one molecular proportion of tetrazo-diphenyl chlorid. A voluminous brown precipitate of a new intermediate is formed. The latter is allowed to stand for several hours with occasional stirring and is then stirred into a solution of 13 kgs. of 1.4-naphtholsulfonic acid in 500 liters of water and 13 kgs. sodium carbonate. No immediate change is observable, but the intermediate gradually dissolves yielding a bluish crimson solution. It is allowed to stand for a few hours with occasional stirring and then heated to boiling to dissolve any remaining precipitate and to form a clearer solution.

The dyestuff is advantageously obtained in a solid form by precipitating it from solution with strong hydrochloric acid. The precipitate may then be filtered off and dried, or may be converted into its sodium salt by treatment with the proper amount of sodium carbonate and then evaporated to dryness.

The product is quite easily soluble in water and dyes cotton in a sodium sulfate bath a bluish purple color; while wool is dyed in an acid sodium sulfate bath a plum to almost black color, depending upon the quantity of dye used.

The tetrazo-diphenyl chlorid used in this example can be prepared by dissolving 11 kgs. of benzidin in 22 liters hydrochloric acid of 1.2 specific gravity diluted with 1000 liters of water and by diazotizing with 8.3 kgs. sodium nitrite dissolved in 50 liters of water.

Example 3: 18.4 kgs. benzidin are converted into tetrazo-diphenyl chlorid in the usual manner with 22 liters of hydrochloric acid of 1.2 specific gravity, 1000 liters of water and 7.5 kgs. sodium nitrite; and the resulting product is then stirred into a solution of 22 kgs. of the sodium salt of chromotropic acid in 500 liters of water containing 30 kgs. of sodium carbonate. A purplish precipitate of a primary intermediate compound is thus formed. It is allowed to stand in the cold for a few hours with frequent stirring and there is then added to it 20 kgs. more of sodium carbonate and the latter is stirred until dissolved. The solution of the primary intermediate compound is then treated with constant stirring with one molecular proportion of diazo-picramic acid. The solution turns reddish-brown, and a dark brown to black precipitate of a secondary intermediate compound is formed. This is allowed to stand with occasional stirring for several hours and is then treated with constant stirring with 12 kgs. of the 1.4 naphtholsulfonic acid, 500 liters of water and 30 kgs. of sodium carbonate. The solution now begins to turn purple and in a comparatively short time it assumes an intense violet color while the precipitate of the secondary intermediate product goes into solution. On being allowed to stand over night, it will be found that the new dye-stuff has for the most part separated as a semi-crystalline black to dark brown precipitate. This precipitate is dissolved on heating to boiling and is re-precipitated as the sodium salt by means of sodium chlorid; and the precipitate is filtered off and dried.

The product thus obtained is a very dark, almost black product which is quite easily soluble in water. The yield is very good. The product dyes cotton in a sodium sulfate bath a purplish blue shade. It dyes wool in an acid sodium sulfate bath a plum to black shade, depending upon the quantity of dye used. After-chroming works advantageously with dyed woolen goods.

The diazo-picramic acid referred to in the above example may be prepared in the following manner:—

10.8 kgs. picramic acid are dissolved in 5 liters of strong aqua-ammonia and diluted with 1000 liters of water. 3.7 kgs. sodium nitrite dissolved in 50 liters of water is then added and the whole is cooled with ice and 10.1 liters of hydrochloric acid of 1.2 specific gravity diluted with 100 liters water is gradually stirred in. A clear solution of diazo-picramic acid is thus obtained which is allowed to stand until complete absorption of all the nitrous acid.

In place of the 1.4-naphtholsulfonic acid used in the above example, other suitable end components can be used.

It will be noted that the dyestuffs described in the specific examples are derived from chromotropic acid and contain the nucleus of this acid as one of the intermediate nuclei. It will further be noted that the other intermediate nucleus is a diaryl nucleus such as that of benzidin. It will further be noted that the tetrazotized benzidin or the tetrazo-diphenyl chlorid is coupled or combined with the chromotropic acid and with another coupling agent which forms an end component of the dyestuff. The chromotropic acid is also combined with another diazotized aromatic amin, the nucleus of which forms the other end nucleus or end component of the dyestuff.

While I have illustrated and described certain specific dyestuffs and given specific examples of their production, I do not wish to limit myself thereto as variations and substitutions are possible, such as the substitution of certain equivalents; but what I claim as my invention is as follows:

1. As new products, azo dyestuffs of the following graphically represented constitution:

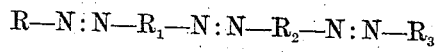

in which $R_1$ is the nucleus of 1.8-dioxynaphthalene-3.6-disulfonic acid, $R_2$ the diphenyl nucleus, $R_3$ the nucleus of a naphthol sulfonic acid and R an aromatic nucleus, said dyestuffs being blue to black to brown products soluble in water, dyeing cotton in sodium sulfate baths bluish or purplish shades, and dyeing wool in acid sodium sulfate baths blue to black to brown shades; substantially as described.

2. As new products, azo dyestuffs of the following graphically represented constitution:

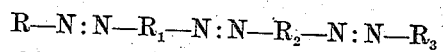

in which $R_1$ is the nucleus of 1.8-dioxynaphthalene-3.6-disulfonic acid, $R_2$ a diaryl nucleus, $R_3$ the nucleus of a naphthol sulfonic acid, and R a substituted benzene nucleus, said dyestuffs being blue to black to brown products soluble in water, dyeing cotton in sodium sulfate baths bluish or purplish shades, and dyeing wool in acid sodium sulfate baths blue to black to brown shades; substantially as described.

3. As new products, azo dyestuffs of the following graphically represented constitution:

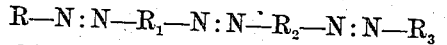

in which $R_1$ is the nucleus of 1.8-dioxynaphthalene-3.6-disulfonic acid, $R_2$ a diaryl nucleus, $R_3$ an aromatic nucleus and R the nucleus of picramic acid, said dyestuffs being blue to black to brown products soluble in water, dyeing cotton in sodium sulfate bath bluish or purplish shades, and dyeing wool in acid sodium sulfate baths blue to black to brown shades; substantially as described.

4. As a new product, the azo dyestuff of the following graphically represented constitution:

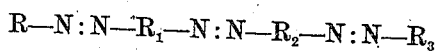

in which $R_1$ is the nucleus of 1.8-dioxynaphthalene-3.6-disulfonic acid, $R_2$ the diphenyl nucleus, $R_3$ the nucleus of 1.4 naphtholsulfonic acid and R the nucleus of picramic acid, said dyestuff being a dark almost black product easily soluble in water, dyeing cotton in sodium sulfate baths purplish blue shades, and dyeing wool in acid sulfate of soda baths plum to black shades; substantially as described.

5. The method of producing azo dyestuffs soluble in water and dyeing both wool and cotton, which comprises combining 1.8-dioxynaphthalene-3.6-disulfonic acid with a diazotized aromatic amin and with tetrazotized benzidin, and combining with the tetrazotized benzidin also a naphthol sulfonic acid; substantially as described.

6. The method of producing azo dyestuffs soluble in water and dyeing both wool and cotton, which comprises combining 1.8-dioxynaphthalene-3.6-disulfonic acid with a diazotized anilin containing an acid group and with tetrazotized benzidin, and combining with the tetrazotized benzidin also a naphthol sulfonic acid; substantially as described.

7. The method of producing azo dyestuffs soluble in water and dyeing both wool and cotton, which comprises combining 1.8-dioxynaphthalene-3.6-disulfonic acid with diazotized picramic acid and with tetrazotized benzidin, and combining with the tetrazotized benzidin also an aromatic nucleus; substantially as described.

8. The method of producing an azo dye-stuff soluble in water and dyeing silk, wool and cotton, which comprises combining 1.8-dioxynaphthalene-3.6-disulfonic acid first with tetrazotized benzidin and then with diazotized picramic acid, and combining the intermediate product thus obtained with 1.4 naphthol sulfonic acid; substantially as described.

In testimony whereof I affix my signature.

JAMES H. STEBBINS, JR.